(12) United States Patent
Brewer et al.

(10) Patent No.: US 7,249,192 B1
(45) Date of Patent: Jul. 24, 2007

(54) PROTOCOL FOR INSURING EXACTLY ONCE SEMANTICS OF TRANSACTIONS ACROSS AN UNORDERED, UNRELIABLE NETWORK

(75) Inventors: Tony M. Brewer, Plano, TX (US); Gregory S. Palmer, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 476 days.

(21) Appl. No.: 09/521,827

(22) Filed: Mar. 9, 2000

(51) Int. Cl.
*G06F 15/16* (2006.01)
*G06F 7/00* (2006.01)
*G06F 11/00* (2006.01)
*H04L 12/28* (2006.01)
*G06F 15/173* (2006.01)
*G06F 17/30* (2006.01)
*H04L 12/26* (2006.01)

(52) U.S. Cl. ............... 709/237; 709/203; 709/219; 709/224; 707/10

(58) Field of Classification Search ........... 709/237, 709/201–203, 211, 217–219, 223–226; 707/8, 707/10, 103, 104; 370/235
See application file for complete search history.

(56) References Cited

U.S. PATENT DOCUMENTS

| | | | | | |
|---|---|---|---|---|---|
| 5,423,042 | A | * | 6/1995 | Jalili et al. | 719/328 |
| 5,612,949 | A | * | 3/1997 | Bennett | 370/253 |
| 5,774,479 | A | * | 6/1998 | Lee et al. | 714/749 |
| 5,838,920 | A | * | 11/1998 | Rosborough | 709/224 |
| 5,903,721 | A | * | 5/1999 | Sixtus | 713/201 |
| 5,923,756 | A | * | 7/1999 | Shambroom | 713/156 |
| 5,926,549 | A | * | 7/1999 | Pinkas | 713/168 |
| 6,105,071 | A | * | 8/2000 | Desnoyers et al. | 709/237 |
| 6,122,743 | A | * | 9/2000 | Shaffer et al. | 713/201 |
| 6,178,449 | B1 | * | 1/2001 | Forman et al. | 709/224 |
| 6,345,296 | B1 | * | 2/2002 | McCrory et al. | 709/228 |
| 6,374,282 | B1 | * | 4/2002 | Bunton et al. | 718/101 |
| 6,385,642 | B1 | * | 5/2002 | Chlan et al. | 709/203 |
| 6,449,631 | B1 | * | 9/2002 | Takamoto et al. | 709/200 |
| 6,449,739 | B1 | * | 9/2002 | Landan | 714/47 |
| 6,477,559 | B1 | * | 11/2002 | Veluvali et al. | 718/101 |
| 6,477,571 | B1 | * | 11/2002 | Ross | 709/224 |
| 6,570,885 | B1 | * | 5/2003 | Gregg | 370/428 |
| 6,598,078 | B1 | * | 7/2003 | Ehrlich et al. | 709/224 |
| 6,614,894 | B1 | * | 9/2003 | Brockman et al. | 379/112.06 |
| 6,701,363 | B1 | * | 3/2004 | Chiu et al. | 709/224 |
| 6,714,976 | B1 | * | 3/2004 | Wilson et al. | 709/224 |
| 6,718,399 | B1 | * | 4/2004 | Chernick et al. | 719/330 |
| 6,779,145 | B1 | * | 8/2004 | Edwards et al. | 714/733 |
| 6,880,057 | B1 | * | 4/2005 | Webber et al. | 711/169 |

\* cited by examiner

*Primary Examiner*—Jason Cardone
*Assistant Examiner*—Melvin H. Pollack

(57) ABSTRACT

The present invention implements a mechanism for reliably communicating transaction messages between source and destination devices connected across an unreliable network, where a transaction is an operation requested by a source device of a destination device and where a plurality of messages are exchanged between source and destination in order to ensure completion of the transaction. Because the network linking the source and destination is unreliable, the source and destination operate to preserve data regarding the transaction messages which they have received and transmitted. If responsive messages are not timely received, they are generally resent. A dual timing system is preferably implemented to ensure that there are never two identical messages simultaneously in transmission through the network.

24 Claims, 2 Drawing Sheets

PROTOCOL FOR INSURING EXACTLY ONCE SEMANTICS OF TRANSACTIONS ACROSS AN UNORDERED, UNRELIABLE NETWORK

BACKGROUND

Generally when conducting communication including transmitting messages, packets, or transactions between data processing or storage devices, some form of protocol or handshaking is required to manage and coordinate the communication. Where only two devices are transmitting information back and forth, such communication management may be relatively straightforward. Generally, direct and continuous contact may be established between two devices enabling misdirected transmissions, omitted information, and erroneous data to be readily identified and corrected.

Such communication management generally becomes more difficult and complex where a plurality of sources communicate with a plurality of destinations across a network as is shown in FIG. 1. In such a network, direct and continuous contact between a source and destination for a particular message will generally not be available. Instead the communication process will generally require that messages be transmitted via one or more intermediate points in the network in between transmission by the source and reception by the ultimate destination. A number of problems may be introduced at the intermediate points in the network including the loss of information, introduction of erroneous information, or a hardware failure causing a complete transmission failure. Such events may leave both the source and destination of the transmission unaware of the problem and unable to resolve it.

One solution employed in the prior art to deal with this problem is the association of sequence numbers with messages or packets transmitted from a source to a destination. With sequence numbers attached to each message, destination devices can check the sequence number associated with a message to ensure that it is the next message in sequence from the source location concerned. If a duplicate message is received at a destination device, the message is generally ignored. If a sequence of messages is received wherein a sequence number has been skipped, a protocol active between the destination and the source will generally cause the skipped message to be resent.

The use of sequence numbers for communication management in a multiple source, multiple destination network will generally impose a substantial processing burden on the system. Generally, each source-destination pair will have its own set of sequence numbers so as to uniquely identify each source and destination within the system. The total number of sequence number sets will generally increase exponentially with increasing network size. For example, where ten processors communicate with ten memory boards, one hundred sequence number sets may be required. Whereas, for one thousand processors and one thousand memory boards, one million sequence number sets will generally be required in order to uniquely identify each source-destination pair. Such a large number of sequence number sets generally increases the burden on each source and destination by increasing the number of bits required to identify the message being transmitted.

Furthermore, such a system is difficult to effectively scale down. For example, where a system is initially designed to accommodate one million sequence number sets, the system may handle the overhead associated with the sequence numbers in an acceptable manner. However, if the same chips were to be used in a small topology involving, for example, one processor and one memory board, a chip set designed to handle one million possible sequence number sets will be employed to handle just one sequence number set for the small topology, thereby imposing an enormous and unproductive overhead cost to operation of the small topology.

Generally, a typical action responsive to a determination by a destination device that a transmission is faulty, or was lost, is to issue a request to the source to retransmit the pertinent information. In a single source, single destination system, such an approach is generally quite feasible. However, in a multiple source, multiple destination system, the very data which identifies the source of the data could be lost during transmission, making it extremely difficult for the destination device to issue a retransmission request. Accordingly, the use of sequence numbers to identify transactions in a multiple source, multiple destination system may make both detection and correction of a transmission error very difficult.

One alternative to the use of a distinct set of sequence numbers for every source-destination pair in a large network is the use of software to dynamically allocate channels at a processor or other communication component in the network. Generally, software operates to allocate a channel within a processor to communicate with another component in source-destination pair for a period of time. When communication is established with a different component, the channel may be re-allocated for communication with the new component and a set of sequence numbers established on-the-fly. This approach generally avoids the requirement of having an immense number of sets of sequence numbers but generally imposes latency on the communication process. Specifically, the time required to initially allocate and re-allocate channels for communication with different components or devices requires a finite period of time. In networks where communication between devices generally experiences very short latencies, such as connections between chips in a computer system, the time required for channel allocation and re-allocation generally imposes an unacceptable delay.

Another alternative to the option of using distinct sequence number sets for all source-destination device pairs in a network is the use of pre-allocated hardware channels on all participating communication devices. FIG. 2 depicts destination devices 202 and 203 having dedicated channel connections to processor agent device 201. This approach presents the advantage of not incurring the communication latencies generally caused by the previously discussed software-based dynamic channel allocation approach, but imposes a substantial requirement for additional hardware functionality on each participating communication device. This added hardware requirement will generally impose substantial additional system cost.

The use of sequence numbers to identify transactions generally imposes a forced ordering of transactions between a source and a destination even where such ordering is not required by higher protocol levels. This is because the destination generally only identifies missed packets by receiving a series of packets whose sequence numbers are not in proper order. However, in a multiple source, multiple destination network, packets with higher sequence numbers may arrive at a destination device prior to an earlier sent packet with a lower sequence number due to the higher numbered packet having taken a more expeditious path through the network. This out-of-order arrival does not necessarily indicate that a packet has been lost. Therefore, a buffer will generally be employed to hold a packet with a higher sequence number so that packets with lower sequence numbers are allowed to pass through the buffer and arrive at the destination first. Such forced ordering thereby generally operates to slow down the transmission of transactions and thereby the network as a whole.

Therefore, it is a problem in the art that the use of distinct sequence number sets for all source-destination pairs in a multiple source, multiple destination network (or large complex network) imposes a burden on communication and computation in the network.

It is a further problem in the art that the use of sequence numbers in a multiple source, multiple destination network may prevent accurate identification of the device which transmitted a data packet identified as defective at a destination device.

It is a still further problem in the art that the use of sequence numbers for packet identification in large complex network generally imposes a need for forced ordering of transactions in said network.

It is a still further problem in the art that the use of software based dynamically allocated channels for sequence numbering of data packets generally imposes unacceptable latency on communication within a computer network.

It is a still further problem in the art that the use of dedicated pre-allocated hardware channels for sequence numbering of data packets in a network generally imposes a substantial cost burden on the system.

SUMMARY OF THE INVENTION

These and other objects, features and technical advantages are achieved by a system and method which enables a storage system employing temporary and reusable entries for monitoring transactions between data sources and destinations across an unordered unreliable transport mechanism. The monitoring of a transaction, and the status thereof, may be performed at a source or destination site. Monitoring of transactions at intermediate points within the transport mechanism is preferably unnecessary with the present invention. Where repetition of the communication of transaction packets or messages is necessary, end to end retry is preferably employed. Generally, end to end retry refers to initiation of a retransmission from one end of a communication link rather than attempting such retransmission from an intermediate point within this link.

In a preferred embodiment, a sequence of transactions is transmitted between a source site, and a destination site, to manage the delivery and acknowledgment of packets between the two sites and to provide unambiguous information regarding the status of all transactions initiated by the source. The inventive mechanism preferably provides exactly once semantics between source and destination over an unordered unreliable network.

In a preferred embodiment, a database, which may be a content addressable memory, associated with each destination device operates as a registry for pending transactions within the network. A preferred embodiment approach involves transmitting a sequence of transaction messages between the source and destination to ensure proper execution of the transaction and to maintain information on the status of the transaction. An exemplary sequence of transaction messages preferably includes a reservation request, a reservation response, a release request, and a release response, which transaction messages are discussed in greater detail in the Detailed Description.

In a preferred embodiment, the transport mechanism is a computer network linking together a plurality of processors, switching devices, memory devices, and other data devices in an unordered and unreliable network. Alternatively, the transport mechanism may include any set of connections between data storage or data processing devices including but not limited to: local area networks and wide area networks. Herein, "unreliable" refers to a condition wherein a source initiating a transaction may not depend on the pertinent network to transmit the message to the desired destination, and may not assume that the destination will execute the desired transaction.

Instead, verification of both the transmission of a request by a source and of the successful completion of a requested transaction by a destination is preferred for the inventive mechanism to conclude that a transaction has been successfully completed. The "end to end" reporting and verification system contemplated herein preferably avoids having to perform enquiries at intermediate points in a network linking the source and destination and removes a need to assume that communication along this network has been successful.

Herein, a site which initiates a sequence of transaction messages to effect a transaction at a another site is a "source site," and the "other" site at which the transaction is executed is a "destination site." The source and destination sites may each include a single component or may include a plurality of components. The terms "source" and "destination" are generally used synonymously with "source site" and "destination site," respectively. In the Detailed Description, the source agent is a device specifically associated with a processor at a source site and the "destination memory control" is a device specifically associated with a memory board at a destination site. However, the term "agent device" is used herein to refer generally to a component or device which serves as an agent to a another device at that site, such as a processor or memory board. Therefore, the term agent device preferably applies to both the "source agent" and the "destination memory control." Since, both the processor and memory board are devices which are being served by other devices, they are referred to generically herein as "master devices." Although the term device generally refers to a single hardware component, the various devices at a site need not be discrete components, but may be integrated into a single package. Furthermore, the function of such devices may optionally be performed in software.

Herein, the term "transaction" includes an operation to be performed at a site remote from source site requesting the operation as well as the communication steps necessary to effect this operation. An operation may be a memory read, memory write, device control operation, or other data transfer or manipulation operation. A sequence of communication steps is preferably undertaken to complete a transaction, and the information packages transmitted in connection with a transaction are referred to herein as "transaction packets," or "transaction messages." These terms may be further qualified according to the content of each message. For brevity, a transaction which includes a read operation is referred to as a "read transaction," and a transaction which includes a write operation is referred to as a "write transaction."

Herein, the term "exactly once semantics" generally refers to a condition wherein each transaction in the system is preferably acted upon only once. Generally, an error condition exists if a transaction is either not performed at all (i.e. zero occurrences), or performed two or more times.

In a preferred embodiment, a source may be a computer processor having an associated agent chip for conducting communication regarding the status of transactions, thereby removing the processor from a critical path for such communication. In a preferred embodiment, the destination is a memory board or other data storage device which preferably has an agent device for handling communication pertaining to transactions with other devices. One possible type of agent device for the data storage device is a destination memory control. Preferably, both the source and destination sites include databases for preserving information regarding the status of a transaction while said transaction is active within the network.

In a preferred embodiment, agent devices included in source and destination sites operate to ensure delivery of transactions across an unreliable network. The use of agent devices for such a maintenance function preferably improves the efficiency of the source and destination devices by relieving them of the processing burden of monitoring transaction communication. Preferably, databases are included at the source and destination sites for storing information identifying the transactions active in the network and the status of these transactions. Preferably, data locations in these databases are used temporarily for particular transactions and are infinitely reusable. Preferably, when a new transaction is generated, an entry associated with that transaction is stored in one or more databases and continues to be used to reference that transaction until the transaction is no longer active in the network. Upon completion of a transaction, the entry for that transaction is preferably released for reuse in association with a new transaction. The data entry mechanism of the present invention is thereby preferably able to serve an infinite stream of successive transactions with a finite number of database entries by releasing device entries upon conclusion of a transaction, and reallocating them upon initiation of a new transaction. Where a transaction, for any reason, cannot be completed, a response packet containing relevant error information is preferably provided to any device awaiting a response in connection with the incomplete transaction. If no device is waiting for a response in connection with an incomplete transaction, error information associated with the transaction is preferably logged locally before resources associated with the incomplete transaction are enabled to be used for other purposes.

In a preferred embodiment, transaction messages may be transmitted by the source sites in any order and received by the destination sites in any order with no adverse effect on the ability of the inventive mechanism to record and manage communication activities between sources and destinations of transactions in a transport mechanism, which may be a computer network. This feature preferably provides for transaction ordering flexibility, thereby removing a constraint on the network generally present when employing sequence numbers. This represents an advantage over the prior art where rigid ordering of transactions generally operates as a constraint on network activity, and in certain cases, causes otherwise executable transactions to remain idle, to enable transactions with lower sequence numbers to be processed first.

In a preferred embodiment of the present invention, the delays associated with allocating a channel for sequence numbers in software at a source or destination site is preferably unnecessary because of the operation of the agent devices and databases at each site as discussed above. Furthermore, the use of temporary reusable entries within the databases for managing the communication of transactions over the network preferably renders the allocation of dedicated hardware channels within a communication device unnecessary.

In a preferred embodiment, if the source does not receive a reply packet responsive to a packet transmitted by the source in a pre-determined time-out period, the source preferably retransmits its packet. This retransmission presents the possibility of having two identical source-issued messages propagating through the system at the same time. In order to prevent this from occurring, the source includes a time stamp in the outgoing packet and establishes a time-out threshold for the outgoing packet, which is preferably shorter than the time-out threshold for the transmitting source, thereby enabling any device in the network to drop the packet from the network when the packet time-out threshold is reached. The system thereby preferably ensures that there will never be two packets being simultaneously transmitted through the network.

Therefore, it is an advantage of a preferred embodiment of the present invention that the computationally burdensome operation of designating distinct sequence number sets for source-destination pair in a communication network is unnecessary.

It is a further advantage of a preferred embodiment of the present invention that forced ordering of transactions is not required, thereby enabling transactions to be efficiently processed at a destination device in the order in which they are received.

It is a still further advantage of a preferred embodiment of the present invention that pre-allocated hardware channels are not required in order to manage the communication of transactions.

It is a still further advantage of a preferred embodiment of the present invention that greater certainty regarding the status of a transaction in the network is provided than was available using the sequence number identification system of the prior art.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
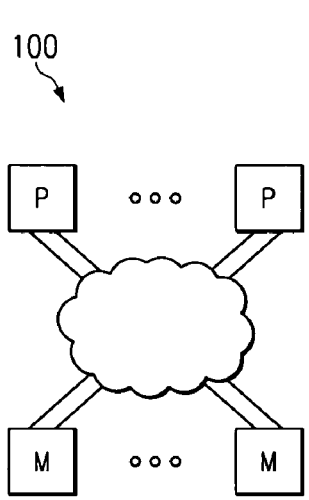
FIG. 1 depicts a multiple source, multiple destination network.
Figure 2:
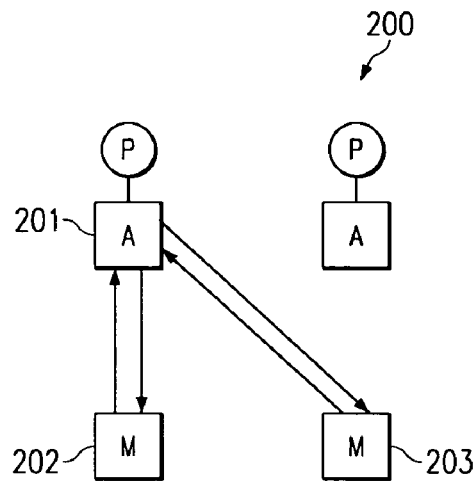
FIG. 2 depicts an agent device and two separate destination devices wherein dedicated channels link each of the destination devices to the agent device.
Figure 3:
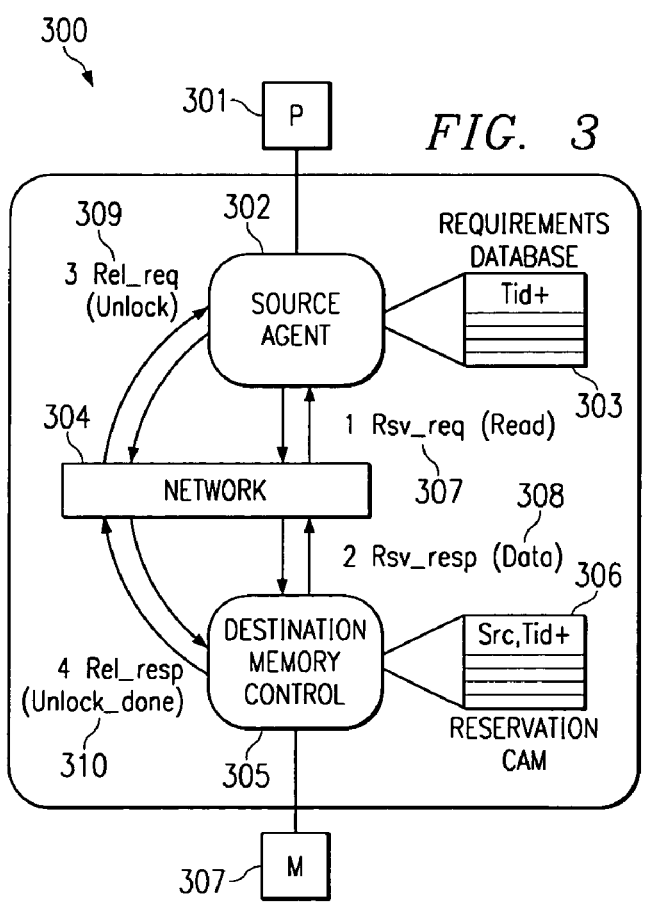
FIG. 3 depicts a transaction scheme employing a destination memory control device according to a preferred embodiment of the present invention.

FIG. 3 depicts a transaction scheme employing a destination memory control device 305 according to a preferred embodiment of the present invention. In a preferred embodiment, source agent 302 is associated with processor 301. Requirements database 303 preferably cooperates with source agent 302 to store the status of transactions and transaction data packets. Network 304 is generally a multiple source, multiple destination computer network but may alternatively be a single device, such as a router, interposed between a single source device and a single destination device. In another alternative embodiment, network 304 may be a local area network or wide area network.

In a preferred embodiment, Content Addressable Memory (CAM) 306 is a memory device which allows any one of its entries to be written to by an external device. CAM 306 preferably includes a feature wherein, when presented with the identification of a source device, or other external device, and an identification of a transaction of interest, memory control 305 will compare the presented transaction identification to all current valid entries in the CAM 306 to determine whether the pertinent transaction is present in the CAM. CAM 306 preferably operates as a database for storing information regarding currently active transactions in network 300.

In a preferred embodiment, processor 301 operates to conduct a transaction with memory board 311, which transaction may be a memory read or memory write operation. The source agent 302 and database 303 at the source site and memory control 305 and CAM 306 at the destination site preferably operate to provide management of the transaction and preservation of data on the progress and status of the transaction so as to minimize latency, avoid duplication of transaction steps, and enable system 300 to possess unambiguous information regarding the status of all transactions pending in system 300 at any given time.

Alternatively, the source 302 and destination 305 devices need not be a processor and memory, respectively, but may include a range of data storage and manipulation devices. For example, a processor to processor transaction, involving a read, write, or other operation is suitable for application of the inventive mechanism. In another alternative embodiment, both memory boards and a processors may be either sources or destinations in the configuration of FIG. 3.

In a preferred embodiment, a sequence of four transaction messages or packets are communicated between source agent 302 and memory control 305 in order to establish a status for each transaction at appropriate points within system 300. It will be appreciated that an alternate number of transactions less than or more than four may be employed to perform the functions of the inventive mechanism, and all such variations are within the scope of the present invention. Preferably, the protocol of the present invention ensures that although individual transaction packets may be issued or received more than once, the transaction being implemented by the various transaction packets is performed only once.

Figure 4:
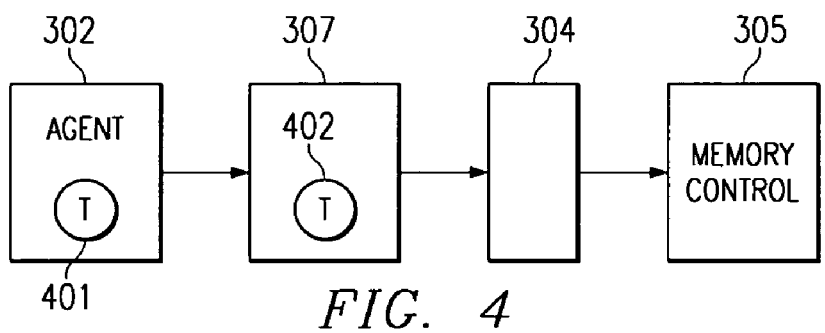
FIG. 4 depicts a transmission of a first of four transaction messages according to a preferred embodiment of the present invention.

FIG. 4 depicts a transmission of a first of four transaction messages according to a preferred embodiment of the present invention. Reference is made to both FIGS. 3 and 4 in the following discussion. Source agent 302 preferably sends reservation request 307 via network 304 to memory control 305. Reservation request 307 preferably includes information describing a transaction being requested by source agent 302 on behalf of processor chip 301 as well a transaction identification to identify the transaction to memory control 305. Reservation request 307 preferably further includes a time stamp 402 to identify to any device within network 304 encountered by request 307 the time at which reservation request 307 was transmitted by agent 302. The information incorporated in time stamp 402 preferably enables reservation request 402 to be dropped from the system, by any device within the system, upon expiration of a predetermined period (the packet time-out period) beginning with the time indicated in time stamp 402.

In a preferred embodiment, agent 302 includes a timing function 401 for recording the time elapsed since the transmission of reservation request 307. Preferably, agent 302 records, in database 303, the fact and time of transmission of reservation request 307. The transmission of reservation request 307 initiates timer 401 in agent 302 to determine whether reservation response 308 is received within a predetermined period of transmission of reservation request 307. If the source agent time-out period elapses without receipt of reservation response 308 at agent 302, agent 302 retransmits reservation request 307. The time-out period for dropping reservation request 307 from the system is preferably smaller than the time period established in agent 302 for retransmitting the reservation request, thereby ensuring that any prior reservation request packets have been dropped from the system prior to transmission of a duplicate reservation request. In this manner, the inventive mechanism preferably operates to ensure that there will be no more than one reservation request pertaining to the same transaction traveling through network 304 at the same time.

In a preferred embodiment, when destination memory control 305 receives reservation request 307, memory control 305 preferably determines whether there is a pre-existing entry in CAM 306 corresponding to reservation request 307. If no corresponding entry is found in CAM 306, memory control 305 preferably concludes that reservation request 307 is being received at memory control 305 for the first time. In this case, the transaction associated with reservation request 307 will preferably be acted upon by writing data to, or reading data from, memory 311.

In a preferred embodiment, if an entry is found in CAM 306 which corresponds to reservation request 307, memory control 306 preferably concludes that reservation request 307 is the result of a resend operation. Generally, at least two options are available to memory control 305 in this case. Where the reservation response generated in response to the packet of which reservation request 307 is a duplicate, is completely stored in CAM 306, control 305 retransmits the stored reservation response as reservation response 308 responsive to reservation request 307. Where, for example, the pertinent transaction is a read operation and data from the read operation is not stored in CAM 306, control 305 will acquire the data from memory board 307 corresponding to the pertinent read operation, and transmit this data as part of reservation response 308 to source 302.

In a preferred embodiment, data resulting from a read operation is not automatically stored in CAM 306. However, where a read transaction is still active in the network, and a memory location which is read from in that read operation will be erased by a prospective write operation or other computing procedure, control 305 preferably loads data from the memory location (which is soon to be over-written) into the CAM so that it will be available in the event that one or more subsequent reservation requests associated with the pertinent read transaction are received by control 305.

Figure 5:
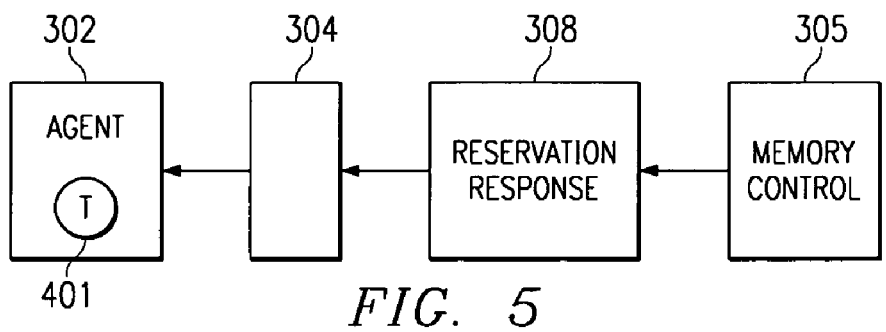
FIG. 5 depicts a transmission of a second of four transaction messages according to a preferred embodiment of the present invention.

FIG. 5 depicts a transmission of a second of four transaction messages according to a preferred embodiment of the present invention. Reference is made to both FIGS. 3 and 5 in the following discussion. FIG. 5 depicts the transmission of reservation response 308 by memory control 305 via network 304 to agent 302. Preferably, generating a reservation response 308 responsive to reservation request 307 includes the steps of generating the data associated with the response, combining this response data with an appropriate transaction identifier to form a reservation response packet, and finally, transmitting reservation response 308.

In a preferred embodiment, the reservation response data is transaction dependent. In the case of a memory "read" operation, the reservation response data preferably comprises the data acquired from memory or memory board 307 as a result of a "read" transaction included in reservation request 307. In the case of a memory "write" operation, there is generally no data to return to source agent 302. The reservation response responsive to a write operation will therefore preferably include an acknowledgment that a requested write operation was successful. Once the reservation response has been prepared, it is stored in the CAM 306 and preferably remains there until a release request packet is received by the memory control 305.

In a preferred embodiment, where a reservation response responsive to the reservation request is not present in the CAM, reservation response 308 is generated and transmitted to agent 302 via network 304 as previously discussed. Where a reservation response corresponding to the reservation request is present in the CAM, indicating that a duplicate reservation request has been received, the already stored reservation response is preferably transmitted to agent 302. Preferably, minimal computational effort is required to transmit this already existing reservation response.

After memory control 305 either discovers reservation response 308 in the CAM 306 or generates the information required therefor, memory control 305 preferably transmits reservation response to source agent 302 as discussed in connection with FIG. 5. For the sake of this discussion, it will be assumed that source agent 302 receives reservation response intact and prior to expiration of timer 401 in source agent 302. Timer 401 preferably counts the time elapsed since the transmission of the reservation request 307 to which reservation response 308 is responsive. The system response to reservation request packets and reservation response packets which have been dropped by the system is discussed later in this application.

In a preferred embodiment, receipt of reservation response 308 by agent 302 preferably informs agent 302 of the status of the transaction which was included in the reservation request originally transmitted by agent 302. Preferably, reservation response 308 will indicate that the transaction read or write operation was successfully executed. Alternatively however, reservation response 308 may include information indicating that a memory read or write operation was not successful. Further, memory control 305 may optionally insert into reservation response 308, details pertaining to an unsuccessful transaction and available options for correcting the problem. In a preferred embodiment, reservation response 308 returns data to source agent 302 and eventually to processor 302 resulting from execution of a successful transaction.

In a preferred embodiment, source agent 302, having received reservation response 308, preferably operates to inform memory control 305 that the data stored in CAM 306 pertaining to the transaction associated with reservation request 307 may be deleted so as to release space in the CAM for use with a new reservation request. It will be appreciated that the released CAM space may be used for a reservation request emerging from any processor connected to network 304 and is not limited to storing such requests only from source agent 302.

Figure 6:
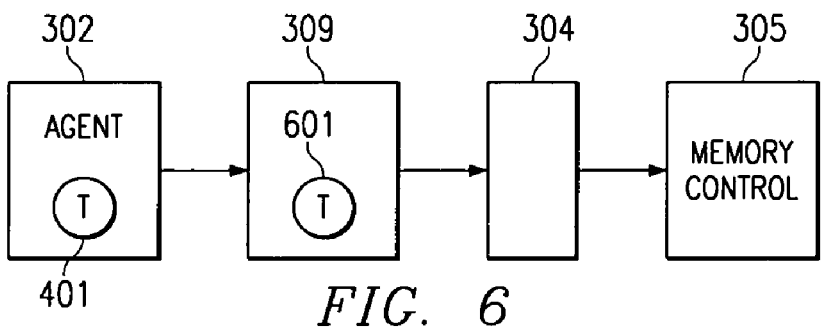
FIG. 6 depicts a transmission of a third of four transaction messages according to a preferred embodiment of the present invention.

FIG. 6 depicts a transmission of a third of four transaction messages according to a preferred embodiment of the present invention. Reference is made to both FIGS. 3 and 6 in the following discussion. FIG. 6 depicts the transmission of release request 309 from source agent 302 across network 304.

In a preferred embodiment, the transmission of release request by agent 302 signifies that agent 302 and processor 301 regard the transaction transmitted by reservation request 307 as having been concluded, and that stored information pertaining to the completed transaction at a destination site, which in this case includes CAM memory 306, is no longer needed. Accordingly, upon receipt of release request 309 by memory control 305, memory control 305 preferably clears the entry in CAM 306 pertaining to the pertinent transaction.

In a preferred embodiment, as was the case with the transmission of reservation request 307, timer 401 in source agent 302 operates to count elapsed time from the transmission of release request 309. If release response 310 is received before timer 401 reaches a retransmission threshold point, the timer is preferably reset and no retransmission occurs. However, if the timer threshold point is reached prior to receipt of release response 310 at source agent 302, source agent 302 preferably retransmits release request 309. Without any other action, a retransmission operation might leave open the possibility of having two identical release requests in transmission through the system at the same time.

Therefore, in a preferred embodiment, a timing mechanism is implemented in the system to cause a release request to "time out" and drop out of the system after a predetermined period has expired since transmission of that release request. As was described in connection with the reservation request, a time stamp 601 is preferably included in release request 309 which may be read by a number of devices which may be encountered by the release request as it propagates through network 304. Preferably, any one of these devices is enabled to read to keep current time and remove release request 309 from the system if the release request packet time-out period has expired.

In a preferred embodiment, in order to ensure that the release request "times out" before source agent 302 issues a retransmission request, the time-out threshold at which system devices drop the release request from the system is preferably shorter than the time-out threshold which source agent 302 employs to signal retransmission of the release request.

Figure 7:
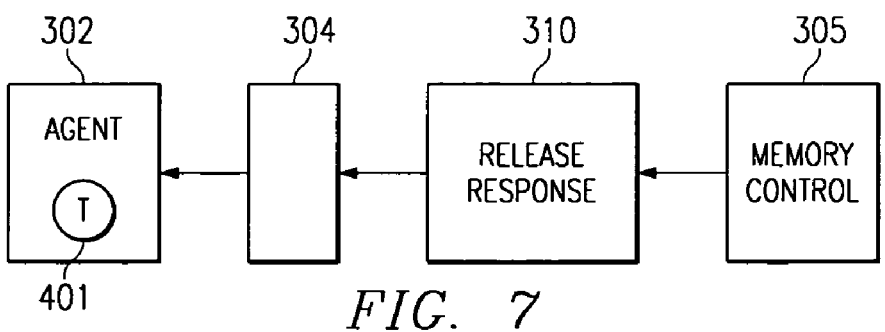
FIG. 7 depicts a transmission of a fourth of four transaction messages according to a preferred embodiment of the present invention.

FIG. 7 depicts a transmission of a fourth of four transaction messages according to a preferred embodiment of the present invention. Reference is made to both FIGS. 3 and 7 in the following discussion. Preferably, memory-control 305 transmits release response 310 across network 304 to agent 302.

In a preferred embodiment, transmission of release response 310 by memory control 305 indicates that the transaction which is the subject of the preferably four transaction messages has been completed and that the CAM entry for this transaction has been released, thereby freeing up space in the CAM 306 for a new reservation request. Preferably, upon receipt of release response 310, source agent 302 appropriately concludes that the transaction has been successfully concluded and proceeds to delete an entry corresponding to the completed transaction in database 303.

In a preferred embodiment, source agent 302 receives the desired results of a transaction when reservation response 308 is delivered to source agent 302. Source agent 302 then preferably communicates this information in a timely manner to processor 301. Subsequently, the third and fourth transaction messages, the release request and release response, respectively, constitute follow-up operations to appropriately inform memory controller 305 and source agent 302 of the status of the transaction at their respective locations and to free up temporarily allocated storage space in database 303 (on the source agent end) and in CAM 306 (on the destination memory control end). Employing source agent 302 for the management of transaction messages and entering and deleting entries in database 303 preferably beneficially enables processor 301 to concentrate on performing operations on the received data, instead of being burdened with communication and database management tasks.

In a preferred embodiment, the provision of services by devices other than the processor, including deleting database and CAM entries for completed transactions and the related communication in both directions of status information, increases processor efficiency and reduces processing and communication latency. The improvement (reduction) in processing latency provided by delegating tasks to the agent 302 and memory control 305 would generally not have been available employing the sequence number systems of the prior art, where processing time would have been spent allocating channels and establishing sequence numbering systems on both ends of a source-destination pair. The inventive approach therefore provides a significant latency advantage over the systems of the prior art.

Generally, packets transmitted across an unreliable network, such as network 304 may be dropped or corrupted. In a preferred embodiment, the problem of network unreliability and the attendant possibility of packets being dropped is preferably handled by employing time-outs at the source of both reservation requests and release requests as well as inserting a time stamp in both of the reservation request packet 307 and release request packet 309. The interaction time-outs at source agent 302 and time-outs occurring at dispersed locations within the system employing the time stamp in the packets has already been discussed in detail and will therefore not be repeated in detail in this section. While the timer in source agent 302 triggers retransmission of a packet, the combination of the time stamp and the ability of dispersed devices within network 304 to check the current time against a time stamp and time-out period included in a packet, operates to drop out of the system, packets which have "timed out." Preferably, the time-out threshold of the packets traveling through the system is set to be lower than the time out employed by the agent 302 to trigger retransmission of a previously sent packet.

In a preferred embodiment, source agent 302 employs a timer to determine when to retransmit a message where an expected response has not been received. Source agent 302 also includes a time stamp in both the reservation request 307 and release request 309 in order to enable the system to drop these requests from the system if they have not reached the destination memory control 305 within an pre-determined time. In a preferred embodiment, memory control 305 does not perform a similar timing operation for messages transmitted to agent 302. Furthermore, memory control 305 preferably does not include time stamps in reservation response 308 and release response 310. It will be appreciated however, that in an alternative embodiment, the process of counting the time elapsed since a message was transmitted could be performed by memory control 305 alone, or by both source agent 302 and memory control 305. Furthermore, in an alternative embodiment, memory control 305 could include time stamps in the packets for reservation response 308 and release response 310, and all such variations are included within the scope of the present invention.

In a preferred embodiment, agent 302 retransmits packets when its logic indicates that a packet responsive to the transmitted packet should have, but has not been, received after a predefined time period has elapsed since a prior transmission of the packet outbound from the source or agent. Source agent 302 preferably retransmits the relevant packet assuming that the previously transmitted packet has been dropped from the system. Generally, the effect on the system of a dropped packet depends upon which of the four transaction communication packets was dropped.

In a preferred embodiment, if a reservation request is dropped en route to memory control 305, agent 302 will time out according to its schedule, and preferably retransmit a duplicate reservation request by accessing database 303. It will be appreciated that agent 302 is not limited to sending the reservation request only twice, but rather, may repeat the transmission as many times as is necessary to ensure completion of this first transaction packet transmission. However, while transient problems in system 300 may account for the loss of one or two packets, agent 302 may establish a threshold number of failed transmissions above which it regards the network as containing a permanent failure and works to arrange for an alternative method of accomplishing the transmission of the required packet.

In a preferred embodiment, where memory control 305 receives a reservation request representing a transaction not found in the CAM 306, control 305 treats the incoming packet as a first reservation request transmission, preferably establishes a new entry in CAM 306, and preferably produces a reservation response responsive to the reservation request packet. Where memory control 305 receives a reservation request representing a transaction which is found in CAM 306, memory control 305 preferably concludes that a reservation response corresponding to the currently requested transaction was produced and transmitted, but dropped from the system. Accordingly, it is preferably not necessary to generate a new reservation response in response to the duplicate reservation request. Preferably, memory control 305 generates a duplicate reservation response with information stored by the original reservation response. In a preferred embodiment, the above logic applies in similar manner to the transmission by source agent 302 of release request 309 and the packet responsive thereto, release response 310. In this case, the logic is generally reversed. Since release request 309 generally causes memory control 305 to delete the entry in the CAM 306 for the pertinent transaction, upon receipt of a first release request 309 without any dropped packets, there should not be an entry corresponding to the transaction associated with the release request.

Accordingly, in a preferred embodiment, if a release request 309 is received which does have an entry in the CAM 306, memory control 305 preferably considers the release request 309 to be a first transmission, appropriately acts to delete the pertinent entry in CAM 306, and generates a release response 310. If a release request packet was dropped before reaching memory control 305, memory control 305 preferably interprets the release request packet to be a first transmission, as described above.

Where a release request is received which does not match an entry in CAM 306, memory control preferably considers release request 309 to be a duplicate transmission, and generates and transmits release response 310 to agent 302 across network 304. It will be appreciated that where the release request does not match any entry in CAM 306, there is no entry in CAM 306 which is suitable for deletion. Memory control 305 then preferably generates and transmits a release response 310 to agent 302 across network 304. The sequence of events described above is consistent with a prior release response 310 having been dropped before reaching agent 302.

For purposes of further discussion, the processor and memory are generally referred to herein as "master" devices, and the source agent and destination memory control as "servant" devices. It will be appreciated that the inventive principles are not limited to the master and servant devices being hardware components. The master devices could alternatively be software programs which delegate selected tasks to "servant" programs, or subroutines, so as to remove the delegated tasks from their respective critical paths and thereby execute more efficiently. Likewise, the servant devices may be programs or sub-routines which serve main programs and operate to perform tasks which relieve their respective main programs of certain time consuming tasks. Preferably, the master and servant software components would implement a similar protocol for preserving transaction results and storing transaction packet message statuses as is described above in connection with hardware versions of the master and servant devices.

Figure 8:
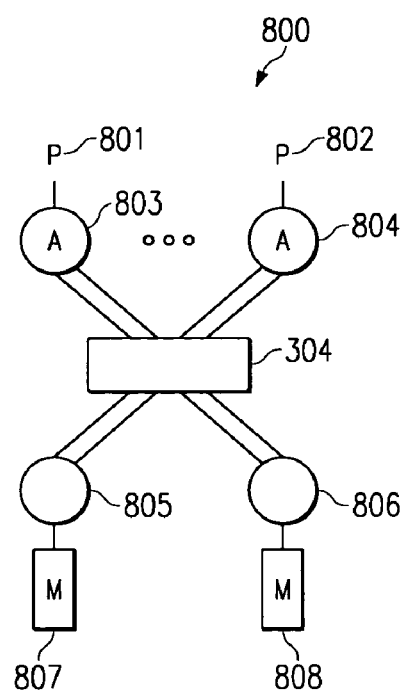
FIG. 8 depicts a network having a plurality of source devices and destination devices the communication between which is routed over an unordered, unreliable network according to a preferred embodiment of the present invention.

FIG. 8 depicts a network having a plurality of source and destination devices, the communication between which is routed over an unordered, unreliable network according to a preferred embodiment of the present invention. FIG. 8 depicts agent 803 associated with processor 801 and agent 804 associated with processor 802. The sequence of dots in between agents 803 and 804 is intended to indicate the presence of a plurality of additional agents also having associated processors. Similarly, memory controls 805 and 806 are associated, respectively, with memory boards 807 and 808. The various agents and memory controls are generally all connected to network 304. In the following paragraph, the combination of an agent and a processor, when acting to request a transaction from a remote location on the network 800, is generally referred to as a source site, and the combination of a memory control and a memory board when operating to service a transaction request received from a remote source site, is generally referred to as a destination site.

In a preferred embodiment, a transaction requested by a source, executed at a destination, and implemented via a sequence of preferably four transaction packets or messages, as described in connection with FIGS. 3-7 may generally be accomplished between any source-destination combination connected across network 800. For example, where there are one hundred source sites and one hundred destination sites, generally ten thousand different source-destination pairs are available. Although one embodiment of the source-destination pairing may include a source which includes a processor and a destination which includes a memory board, it will be appreciated that source sites are not limited to having processors, and that destination sites are not limited to having memories or memory boards. In alternative embodiments, both processors along with associated equipment, and memory boards along associated equipment, may operate as either source sites or destination sites, and all such variations are included within the scope of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for executing a data operative transaction in a network having a source site and a destination site, the method comprising the steps of:
    transmitting an initial transaction request message from said source site to said destination site;
    receiving said transaction request message at said destination site;
    generating a data entry related to the progress of said data operative transaction in a destination database; and
    preserving said association of said data entry with said data operative transaction in said destination database so long as said data operative transaction is active in said network.

2. The method of claim 1, comprising the further step of:
    executing said data operative transaction at said destination site, thereby producing transaction results.

3. The method of claim 2, comprising the further step of:
    where a prospective operation will override said transaction results in a memory board,
    storing said transaction results in said destination database, thereby enabling retransmission of said transaction results if a further reservation request message is received at said destination site.

4. The method of claim 2, comprising the further step of:
    transmitting said transaction results to said source site over said network.

5. The method of claim 1 comprising the further step of:
    transmitting another transaction request message if no response is received from said destination site at said source site within a source site time-out period.

6. The method of claim 5, comprising the further step of:
    deleting said initial transaction request message from the network if said transaction request message does not reach said destination site within a request message time-out period, wherein said source site time-out period exceeds said request message time-out period to prevent having two transaction request messages simultaneously in transmission through said network.

7. The method of claim 4, comprising the further steps of:
upon receiving a duplicate transaction request message, identifying the data entry in the destination database established for said data operative transaction;
acquiring said transaction results; and
retransmitting said acquired transaction results to said source site.

8. The method of claim 7, wherein the step of acquiring comprises:
retrieving said transaction results from said destination database.

9. The method of claim 7, wherein the step of acquiring comprises:
executing said data operative transaction in response to said duplicate transaction request message, thereby producing said transaction results.

10. The method of step 4, comprising the further steps of:
receiving said transmitted transaction results at said source site; and
transmitting, from said source site to said destination site, a release request to delete said data entry associated with said data operative transaction in said destination database.

11. The method of step 10, comprising the further steps of:
receiving at said destination site, said release request to delete said data entry associated with said data operative transaction; and
deleting, within said destination database, said data entry associated with said data operative transaction, thereby liberating space in said destination database.

12. The method of step 11, comprising the further step of:
transmitting, from said destination site to said source site, a release response message, thereby indicating that said data entry associated with said data operative transaction in said destination database has been deleted.

13. The method of step 1, comprising the further step of:
wherein the source site includes a processor and an agent device,
delegating said step of transmitting said initial transaction request message to said agent device.

14. A system for reliably executing a data operative transaction at a destination site requested by a source site, the system comprising:
means for transmitting an initial transaction request message to said destination site from said source site;
means for executing said data operative transaction associated with said initial transaction request message at said destination site;
a reservation database at said destination site for storing information uniquely identifying said data operative transaction and for storing information tracking the progress of said data operative transaction.

15. The system of claim 14, wherein the reservation database is a content addressable memory.

16. The system of claim 14, wherein the source site comprises:
a processor; and the destination site comprises:
a memory.

17. The system of claim 16, wherein the source site further comprises:
a processor agent device for conducting communication with said destination site, thereby enabling said processor to efficiently concentrate on other tasks.

18. The system of claim 17, wherein the source site further comprises:
a source site database for preserving an identification and a status of said data operative transaction until said transaction is complete.

19. The system of claim 16, wherein the processor agent device comprises:
a timer for initiating a retransmission of said transaction request message if no message responsive to said initial transaction request message is received at said processor agent device upon expiration of a retransmission time-out period.

20. A system for executing a data operative transaction in a network having a source site and a destination site, the system comprising:
means for transmitting an initial transaction request message from said source site to said destination site;
means for receiving said transaction request message at said destination site;
means for establishing a plurality of data entries related to the progress of said data operative transaction in a destination database located at said destination site; and
means for preserving said data entries in said destination database so long as said data operative transaction is active in said network.

21. The method of claim 1 wherein said data operative transaction is one of a memory read and a memory write.

22. The system of claim 14 wherein said data operative transaction is one of a memory read and a memory write.

23. The system of claim 20 wherein said data operative transaction is one of a memory read and a memory write.

24. A method for executing a memory device control transaction in a network having a source site and a destination site, the method comprising the steps of:
transmitting an initial transaction request message from said source site to said destination site;
receiving said transaction request message at said destination site;
establishing a plurality of data entries related to the progress of said memory device control transaction in a destination database; and
preserving said association of said data entry with said memory device control transaction in said destination database so long as said transaction is active in said network.

* * * * *

UNITED STATES PATENT AND TRADEMARK OFFICE
CERTIFICATE OF CORRECTION

| | | |
|---|---|---|
| PATENT NO. | : 7,249,192 B1 | Page 1 of 1 |
| APPLICATION NO. | : 09/521827 | |
| DATED | : July 24, 2007 | |
| INVENTOR(S) | : Tony M. Brewer et al. | |

It is certified that error appears in the above-identified patent and that said Letters Patent is hereby corrected as shown below:

On sheet 1 of 2, in Fig. 3, delete tag "307" and insert -- 311 --, therefor.

In column 1, line 5, above "BACKGROUND" insert -- TECHNICAL FIELD The invention relates in general to data transmission over a network and in particular to efficiently monitoring such data transmission over an unreliable network. --.

Signed and Sealed this

Fifth Day of August, 2008

JON W. DUDAS
*Director of the United States Patent and Trademark Office*